United States Patent
Bilstad et al.

(10) Patent No.: US 8,325,889 B2
(45) Date of Patent: Dec. 4, 2012

(54) EFFICIENT AUTHENTICATION OF A USER FOR CONDUCT OF A TRANSACTION INITIATED VIA MOBILE TELEPHONE

(75) Inventors: Lars Sigve Bilstad, Stabekk (NO); Ole Vidar Hestås, Tranby (NO); Atle Hedløy, Stabekk (NO)

(73) Assignee: mobileAxept AS (NO)

( * ) Notice: Subject to any disclaimer, the term of this patent is extended or adjusted under 35 U.S.C. 154(b) by 1581 days.

(21) Appl. No.: 11/615,211

(22) Filed: Dec. 22, 2006

(65) Prior Publication Data

US 2008/0152099 A1  Jun. 26, 2008

(51) Int. Cl.
*H04M 11/00* (2006.01)
(52) U.S. Cl. .................... 379/93.12; 379/93.02
(58) Field of Classification Search ........ 379/93.12, 379/93.02, 142.05, 90.01; 455/466; 380/257, 380/270
See application file for complete search history.

(56) References Cited

U.S. PATENT DOCUMENTS

| | | | |
|---|---|---|---|
| 6,799,155 B1 * | 9/2004 | Lindemann et al. | 455/558 |
| 2001/0028636 A1 | 10/2001 | Skog et al. | |
| 2001/0045451 A1 | 11/2001 | Tan et al. | |
| 2002/0110230 A1 | 8/2002 | Leuca et al. | |
| 2002/0159597 A1 * | 10/2002 | Adams | 380/257 |
| 2003/0157925 A1 | 8/2003 | Sorber et al. | |
| 2005/0033983 A1 * | 2/2005 | Takekawa et al. | 713/200 |
| 2005/0125315 A1 | 6/2005 | Munoz et al. | |
| 2010/0041423 A1 * | 2/2010 | McNamara et al. | 455/466 |
| 2010/0076853 A1 * | 3/2010 | Schwarz | 705/15 |

FOREIGN PATENT DOCUMENTS

| | | |
|---|---|---|
| EP | 1 221 669 A1 | 7/2002 |
| NO | 20034909 | 11/2003 |
| WO | WO 03/046784 A1 | 6/2003 |
| WO | WO 2004/052026 A2 | 11/2003 |
| WO | WO 2005/109938 A | 11/2005 |
| WO | WO 2006/052137 A1 | 5/2006 |

OTHER PUBLICATIONS

Communication pursuant to Article 94(3) EPC Application No. 07 860 921.1-2413 dated Jul. 28, 2011.
Non-Final Office Action U.S. Appl. No. 12/520,270 dated Mar. 28, 2012.

* cited by examiner

*Primary Examiner* — Stella Woo
(74) *Attorney, Agent, or Firm* — Merchant & Gould P.C.

(57) ABSTRACT

A method and system for authenticating a user for conduct of a transaction initiated by the user via a data-enabled telephone is presented. Efficient use is made of keystrokes on the data-enabled telephone. The data-enabled telephone is capable of initiating telephone calls over a telephone network and of engaging in two-way data communication with a data server in a network and the server enables conduct of the transaction. Caller identification information is received at the server. The information is associated with a telephone call request initiated by the user via the data-enabled telephone to a service number. The caller identification provides basis for authentication of the user and the caller identification information received at the service number is used to address a message to the user. Included in such a message is a logon key for use by the user in accomplishing the transaction. Thus the user can use the logon key to enter into data communication with the server for conduct of the transaction.

17 Claims, 8 Drawing Sheets

EFFICIENT AUTHENTICATION OF A USER FOR CONDUCT OF A TRANSACTION INITIATED VIA MOBILE TELEPHONE

TECHNICAL FIELD

This invention relates to authentication of transactions, and more particularly to authentication of transactions initiated via mobile telephone or other data-enabled telephone.

BACKGROUND ART

Numerous enterprises offer Internet, Intranet and Extranet services which require the user to authenticate him or herself to conduct a transaction, such as accessing a personal bank account, purchasing goods or services or accessing information which may have limited access for any number of reasons. Such transactions are often conducted over the World Wide Web.

Accomplishing transactions of this type using a mobile telephone (as defined below) is difficult. Many suppliers of such information wish to allow access to such World Wide Web access directly or via the Wireless Application Protocol (WAP), but limitations, among other things, of keyboards associated with mobile telephones pose obstacles to the user.

Although user-specific information, such as Caller ID, normally is sent with a call request from a telephone (including from a mobile telephone), no such unique identifier is sent with most standard WAP or web requests from mobile devices. Thus while a person receiving a phone call can typically use caller ID to determine from which telephone the call originates, a WAP or web server typically lacks data identifying specifically the mobile telephone or other device accessing its services.

As a result, existing methods to offer secure web sites normally includes more or less complex processes for the user to identify him or herself, for example by requiring an ID card of the user at a bank, or having the user send a signature as a response to a certified or registered mail letter before a first use, and then requiring use of a combination of a logon name or account number for identification and a password or PIN code for verification. In fact, account numbers or user names and PIN codes have become so frequent that users no longer are able to remember all their different identities and passwords. As a result, users often have to write down their different user names and password in a "secure" location, thus compromising security, or simply do not use the service.

Other methods include voice identification for identification and/or verification, or other types of biometric data readers, such as fingerprint.

Other methods include attaching special devices to the terminals to read credit cards or other user cards, maybe combined with a PIN code.

However, users find such known methods cumbersome and time consuming, particularly in the context of mobile telephones, since the small space allocated to the keyboard makes the entry of long strings difficult, particularly in response to dialogs in which the user is prompted to supply a series of responses that give passwords and user identifications, for example. Furthermore, in a mobile setting, the user may not have access to his or her "secure" storage of user names and password.

It is an object of the invention to provide method for user authentication and a related system in which a user may conduct a transaction whereby a user may conduct a transaction in a less cumbersome and less time consuming manner.

It is a further object of some embodiments of the invention to provide a method which can be used in a system incorporating a mobile setting in which a user may be authenticated in order to allow the user to perform a transaction.

SUMMARY OF THE INVENTION

Embodiments of the present invention provide ways of a authenticating a user for conduct of a transaction initiated by the user via a mobile telephone (or other data-enabled telephone) of the user in such a manner as to make efficient use of keystrokes on the telephone. Such embodiments may be implemented so as to reduce or eliminate the need for entering a user name or password. Furthermore, various embodiments facilitate activity by a user of a mobile telephone or other data-enabled telephone to easily and securely log on to a secure web or WAP site a minimum of codes and passwords to remember. Various embodiments take advantage of Caller ID data that are generated at a time a telephone user, including a mobile telephone user makes a telephone call.

In a method according to one embodiment of the present invention, the mobile telephone is capable of initiating telephone calls over a wireless telephone network and of engaging in two-way data communication with a data server in network. The data server, which may be implemented, for example, as a WAP server or a web server, enables conduct of the transaction. The method includes receiving caller identification information associated with a telephone call request initiated by the user via the mobile telephone to a service number. This caller identification information provides a basis for authentication of the user. The method further includes using the caller identification information received at the service number to address a message to the user, as well as including, in the message, a logon key for use by the user in accomplishing the transaction. Finally the method includes sending the message; so that on receipt of the message, the user may use the logon key to enter into data communication with the server for conduct of the transaction.

In further related embodiments, including in such message a logon key includes providing the logon key and service web-address as a hyperlink, e.g. on the form www.servicedomain.com/logon.asp?logonkey=XYZ, where www.service-domain.com is the web site for the service, logon.asp is the specific logon page for the domain, and XYZ is the logon key. The logon key in a further embodiment identifies the user. Optionally, the logon key has a lifetime, for purposes of accomplishing the transaction, of less than a specified amount of time. The lifetime may, for example, be limited to less than 6 hours, or less then 1 hour. In further embodiments, the lifetime may be limited to a specific number of log-ons, e.g. one logon, or one log-on within a certain time frame, e.g. one logon and the logon must occur within one hour.

In yet further embodiments the message is a WAP push message. Optionally, the caller identifying information includes a telephone number of the mobile telephone.

In a further related embodiment, receiving and using the caller identification information is accomplished without answering the call request, so that a connection does not result from the call request. Alternatively, receiving and using the caller identification information includes answering the call request, so that a connection is established.

In yet another related embodiment, sending the message includes sending the message to the user's mobile telephone and, on receipt of the message, the user may use the logon key to cause the key to cause the mobile telephone to enter into data communication with the server.

In another embodiment, the invention provides a system for authenticating a user for conduct of a transaction initiated by the user via a data-enabled telephone of the user in such a manner as to make efficient use of keystrokes on the data-enabled telephone. Again, in this embodiment, the data-enabled telephone is capable of initiating telephone calls over a telephone network and of engaging in two-way data communication with a data server in a network. The data server enables conduct of the transaction. In this embodiment, the system includes a telephone server, associated with one or more service telephone numbers, for receiving caller identification information associated with a telephone call request initiated by the user via the data-enabled telephone to the service number. A specific service telephone number may be linked to a specific service, such as a donation service, or a specific service provider, such as a specific bank. The caller identification provides a basis for authentication of the user. The telephone server uses the caller identification information received at the service number to address a message to the user. The message includes a logon key for use by the user in accomplishing the transaction. The telephone server also sends the message. The embodiment also includes a data server for data communication with the data-enabled telephone of the user, accessible to the user upon use of the logon key by the user. In this embodiment, on receipt of the message, the user may use the logon key to enter into data communication with the data server for conduct of the transaction.

In a further related embodiment, wherein the data-enabled telephone is a mobile telephone. Optionally, the data server is a WAP server, and also optionally, the logon key is a hyperlink to a web site. In addition, the logon key may identify the user. Optionally, the logon key has a lifetime, for purposes of accomplishing the transaction, of less than a specified amount of time, which may be, for example, less than 6 hours, or less than 1 hour. Also optionally the logon key can be used a limited number of times for purposes of accomplishing the transaction, for example, only once, or only once and the logon must occur within a certain timeframe, for example, within an hour.

Also optionally, the message is a WAP push message. In a further related embodiment, the caller identifying information includes a telephone number of the mobile telephone. Optionally, the telephone server obtains the caller identification information without answering the call request, so that a connection does not result from the call request. Alternatively, the telephone server may obtain the caller identification information in the course of answering the call request, so that a connection is established following the call request.

In a further related embodiment, the data-enabled telephone may have preinstalled software which can automatically establish the connection for accomplishing the transaction, based on the message and the logon key.

An advantage of various embodiments is that they may be deployed without any software updates, downloads or other changes to the mobile telephone. Furthermore, embodiments may be implemented with more than one level of security, e.g. security based on Caller ID for medium sensitive data and operations, and an additional PIN code, for example, for more sensitive data and operations.

The present invention also includes a computer readable medium storing program instructions by which the method of the invention can be performed when the stored program instructions are appropriately loaded into one or more computers, and a system for implementing the method of the invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF SPECIFIC EMBODIMENTS

Definitions. As used in this description and the accompanying claims, the following terms shall have the meanings indicated, unless the context otherwise requires:

A "data-enabled telephone" is a communication device that is able both to initiate telephone calls over a telephone network and to engage in two-way data communication with a data server (such as a WAP server or a web server) in a data communication network; The data communication network may be a computer network, a communication network, or any otherwise known network capable of transmitting digital information. A data-enabled telephone (an example of which is the French Minitel) may operate over a wired telephone network or may be a mobile telephone (as defined herein).

A "mobile telephone" is a personal communication device that is able both to initiate telephone calls over a wireless telephone network and to engage in two-way data communication with a data server (such as a WAP server or a web server) in a computer network; accordingly, the term "mobile telephone" includes a conventional cell phone having access to the World Wide Web directly or via the wireless application protocol (WAP) or internet access capability as well as an appropriately configured smartphone or a telephone-enabled personal digital assistant (PDA). A "mobile telephone" is therefore a species of a data-enabled telephone.

In an embodiment of the present invention, user identification and verification is achieved by a service provider providing a service telephone number (access number). E.g. the service provider may be a church or charity donation system, or a banking application. The charity may have its own service number, in order to allow its donors to donate money to the church. The charity may also provide other, specific telephone numbers for targeted gifts, e.g. for gifts to aid after a natural disaster. Similarly, the bank may provide a specific number for online, mobile banking.

In another embodiment of the invention, the service provider may service several charities, banks and other organizations, each with its own service access number or numbers. Such a service provider may be called a Service Implementer. Normally, the Service Implementer's customers are the Service Providers. For simplicity, in this document, the terms Service Provider and Service Implementer are used interchangeably.

Further exemplary embodiments are described in the following examples.

Example 1

Figure 1:
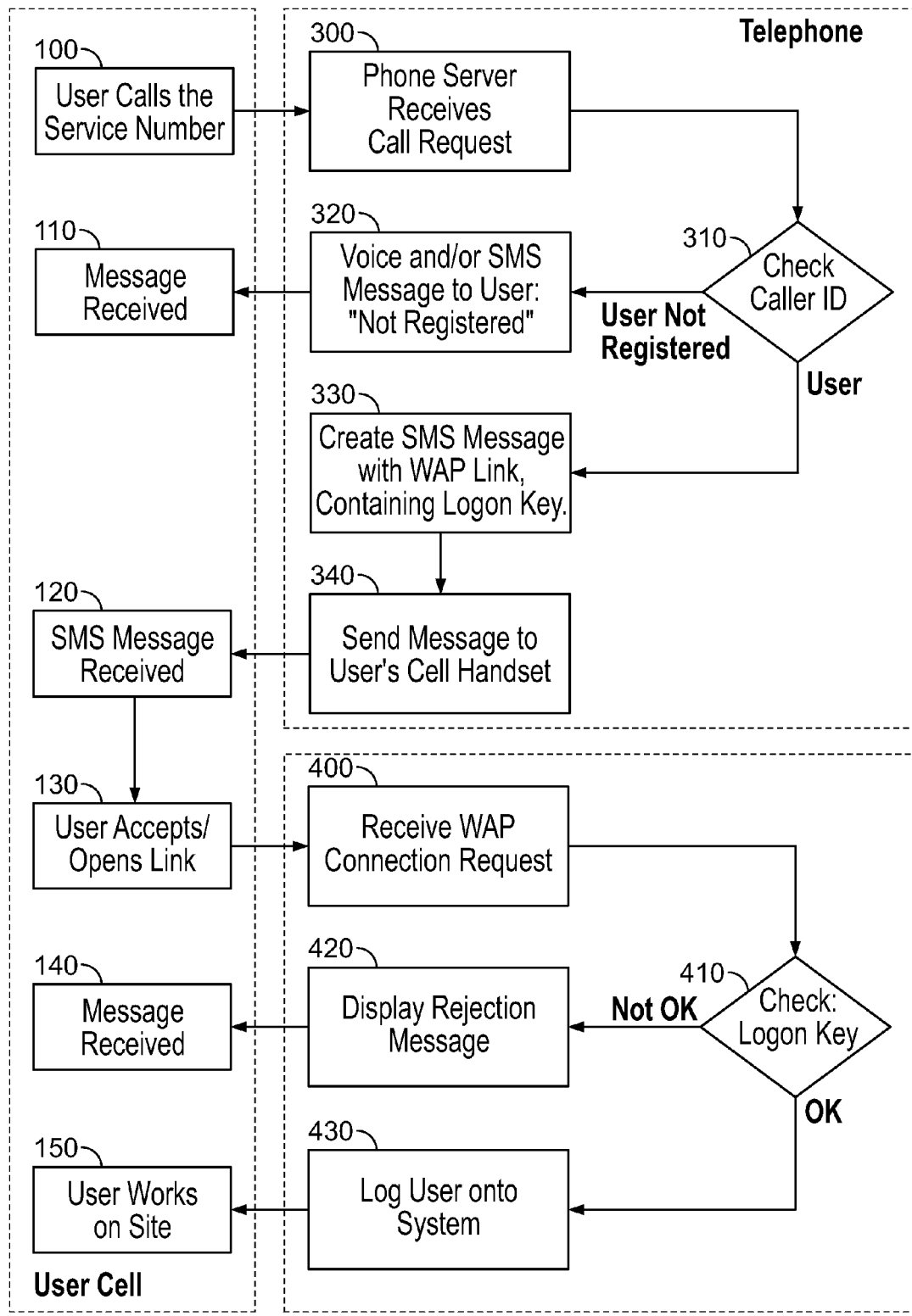
FIG. 1 is a flow chart illustrating a method and system for user identification and verification according to an exemplary embodiment of the present invention.

A flow chart of an identification and verification system and method according to a first exemplary embodiment of the invention is depicted in FIG. 1. In this example, we have assumed that the call is initiated by the user on a mobile telephone. However, it is within the scope of the present invention for the user to initiate the call on any other data-enabled telephone, such a French Minitel.

Users who wish to get access to a service, such as to donate money to a charity or access their online mobile bank, will dial the appropriate service access number 100.

The service provider's telephone server receives the call request 300 and reads the associated data, or at least the necessary part of the data. Such data may include Caller ID (which may include the user's telephone number), The telephone server may or may not answer the telephone call request, as the associated data may be available without answering the call The Service provider's telephone server checks to see if the user is registered for this service 310, for a bank application this normally includes checking that the Caller ID is associated with one or more bank account numbers. For a donation service, the Caller ID would normally be associated with a credit card number or other payment account number, possibly together with information required for charity tax deductions.

As will be readily apparent to those skilled in the art, if a user is already registered with his or her credit card number in connection with donations to one charity, the user may subsequently call another charity's access number connected to the same telephone server and donate money, without further registration, or even pay for purchases calling the appropriate service access number.

If the user's Caller ID is not registered for the service, the telephone server may send a message back to the user 320. In a typical embodiment, the server will then answer the call request and play a voice message back to the user informing that he or she must first register. The user may then be given the choice to receive an SMS WAP push message with a link to a web server in order to register, or, alternatively, to register at once through this telephone connection. If the user wishes to register over the phone, he or she is connected to the registration module. In a typical embodiment, the registration module will interact with the user with voice/DTMF, in which the user can type in the required registration information using the phone keyboard. The user may also be connected to a staffed service at this point.

If, on the other hand, the user is registered (or no registration is required), the telephone server will create a unique message including the logon key 330. In one embodiment, this is simply a hyperlink to a web site, i.e. a web address, for the service (the same for all users) with a unique system generated string as a parameter serving as the logon key (normally different for each user and each request). In this embodiment, the logon key is stored with a time stamp and the users associated data in the service providers system's memory. An exemplary method is to send the unique message as an SMS WAP push message to the user's cell phone.

The telephone server, in related embodiments, may also send different messages, and utilize different message formats, dependent on the capabilities of the user's telephone. The capabilities of the user's telephone can be made available as information stored in the system, in order that the message format can be adapted to known capabilities of the user's phone. The system may for example know the size of the telephone screen, such as the number of pixels or characters which can fit on one display page, and format the message accordingly. In exemplary embodiments, the telephone server will send WAP push messages, or MMS messages to phones that can handle these types of messages, and different kinds of messages to other phones.

The telephone server may utilize data as to the kind of phone the user has either because the user has given such data to the server, or because the telephone server may be able to determine the telephone type and model number from the information included in the user call request, and then look up the phone's capabilities.

When the user receives the SMS WAP push message 120 he may select the web link 130, and the user's phone or terminal will make a connection with the web site.

The web link is typically implemented as a logon key and may include a time stamp or similar, possibly encoded, which will make the server accept these unique data elements for logon for a limited time, to increase security. If so, the web server system will look at the logon key in the log-on request, and, if the time stamp is expired, access will not be allowed. However, if the connection attempt is made within the limit set by the time stamp, and all other parts of the log-on parameters are ok, the server system will allow access.

The logon key of the response message may also, or instead, include other features which limit multiple or indefinite accesses. In one embodiment, the server allows only one or a limited number of logons with any given logon key. Thus, in order to log on yet another time, the user may first have to obtain a new logon key. In one embodiment, the logon key may be used only for identification, i.e. to let the web server know which account the user wish to access.

The log on key for use by the user may also have a limited lifetime for limiting the time available for accomplishing a transaction. Such a lifetime can for example be less than 6 hours or even as low as 1 hour to limit the time such a transaction is accessible to the user, and for increasing security.

The server may then ask the user to provide verification, e.g. in the form of a PIN code, fingerprint or any other form of verification that the user is who he or she claims to be. Some servers may also have different levels of security, e.g. simple and less sensitive tasks accept the logon key as identification and verification, while if the user wants to perform more sensitive tasks system may ask the user to provide stronger verification, such as a PIN code, biometric verification such as voice identification or fingerprint, etc. One such application may be in banking where the bank server may accept the logon key as identification of the user and verification for simple tasks, such as seeing the bank balance or transferring funds between the user's own accounts, and require stronger verification, e.g. in the form of a PIN code, to transfer funds to 3rd parties.

Returning now to the figure, the web server receives the browse request with the logon key 400, e.g. in the parameter, and looks it up to compare with previously stored logon keys 410. If found, the web server checks that the time stamp is OK, i.e. that the user logon attempt is within the set time limit 410. If so, it allows access to the web site, and presents the first web page with the user already logged in 430. If the logon key is not found, or the logon attempt is after the time limit, another web page is presented to the user, informing him or her of the failure 420.

Once the user s logged on to the web site, he or she may move around freely, as on any web site.

Example 2

Figure 2:
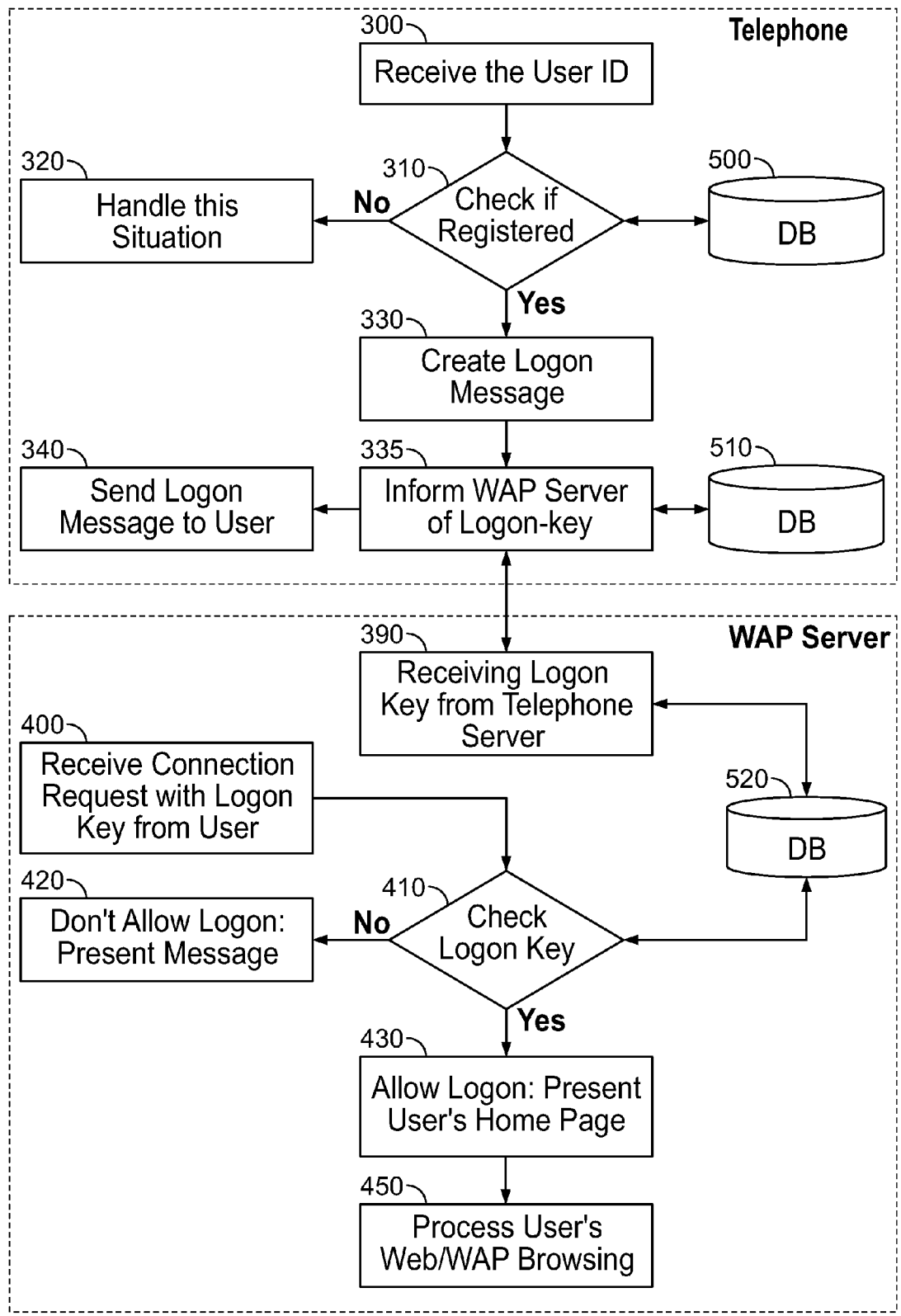
FIG. 2 is a flow chart illustrating another method and system for a user identification and verification, according to another exemplary embodiment of the present invention.

A flow chart of an identification and verification system and method according to another exemplary embodiment of the invention is depicted in FIG. 2.

Once the telephony server receives the user ID 300, it checks to see if this user is registered by checking against a database 500 of registered users for this service 310. If the user is not registered for the service, the system performs the appropriate handling of this situation 320, for example, including telling the user that s/he needs to register for the service first.

If, on the other hand, the user is registered (or no registration is required), the telephone server will create a unique message including the logon key 330. In a typical embodiment, this is simply a web address for the service (the same for all users) with a unique system generated string as a parameter serving as the logon key for this particular user and log-on attempt. An exemplary method is to send the unique message as an SMS WAP push message to the user's cell phone. The system also informs the WAP or web server for the service that it can expect a logon with these parameters 335, and this is logged in a database 510. The log 510 may or may not be in the same database as the registration information 500 the system also sends the unique to the user.

The WAP server receives the message and the log-on string parameters from the telephone server 390, and stores these parameters, associated with the user in a database 520. The database may simply be a list stored in the computer's memory, a file, or a relational or any other database.

Once the user attempts the log-on using the unique log-on string received from the telephone server 400, the WAP server checks 410 with the database 520 to see if this is a correct log-on string.

If the log-on string is not correct, the system does not allow the log-on and presents a message to the user 420. If, on the other hand, the log-on parameters are correct, the system proceeds to step 430 and allows the log-on, presenting to the user the appropriate web/WAP page.

The user may now interact with the web/WAP site normally 450.

Example 3

Figure 3:
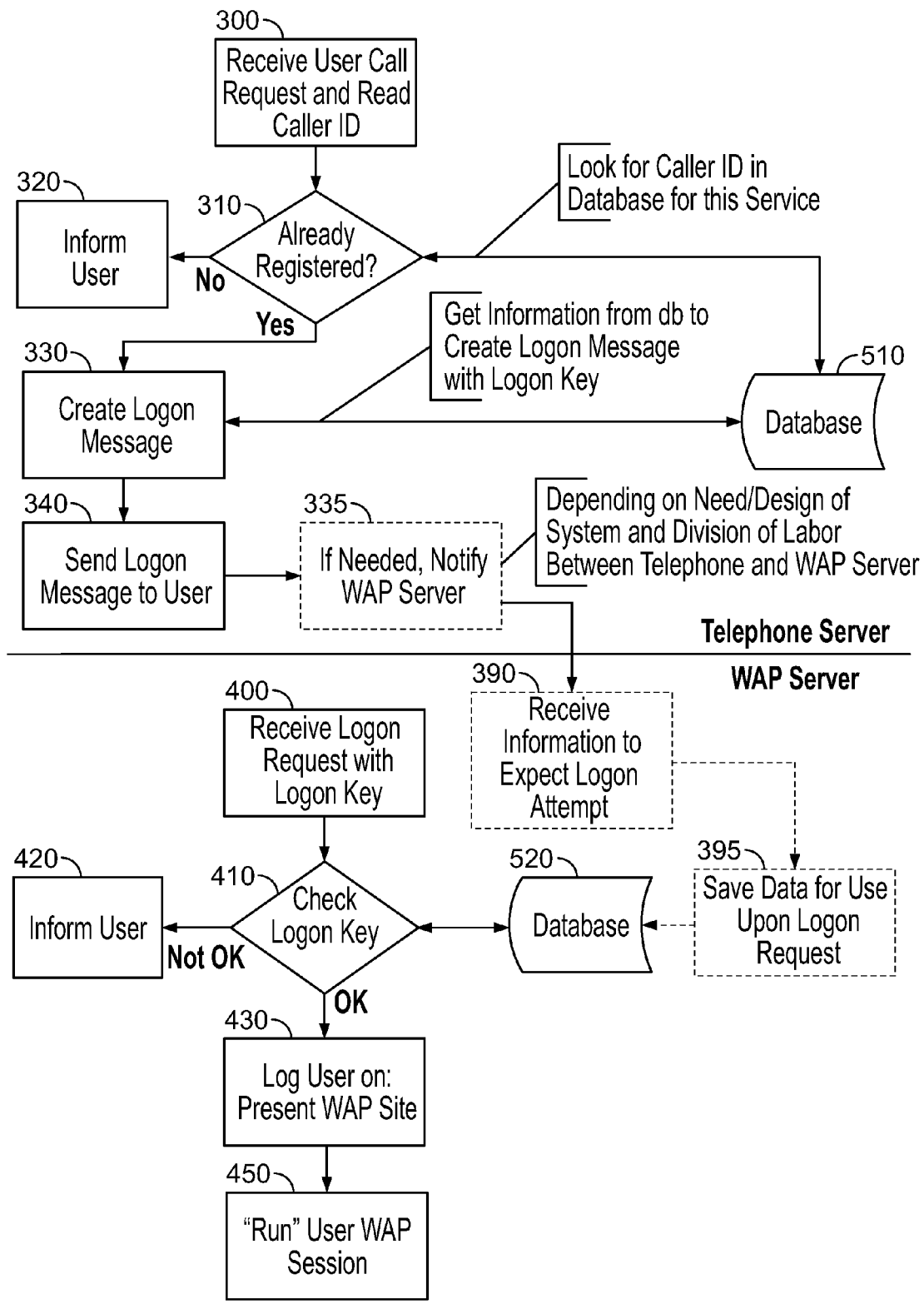
FIG. 3 is a flow chart illustrating another exemplary embodiment of the invention.

A flow chart of another exemplary embodiment of the invention is depicted in FIG. 3. This exemplary embodiment is similar to that of Example 2 above, with some differences, as described here. In Step 330, the unique logon message is created using information previously stored in a database, for example, during registration. Steps 335, 390 and 395 are optional, as for some embodiments these steps may not be needed, if the unique log-on string can be interpreted correctly by the WAP server without the WAP server's getting the specific log-on string, or part of it, from the telephone server. An example of a situation when these steps are needed is in the case that the unique log-on string is generated randomly, or if it for some other reason it is not possible to identify the user from the log-on string. If, however, it is possible to find the WAP server user ID associated with the user fro the log-on string, these steps are not needed.

Example 4

Figure 4:
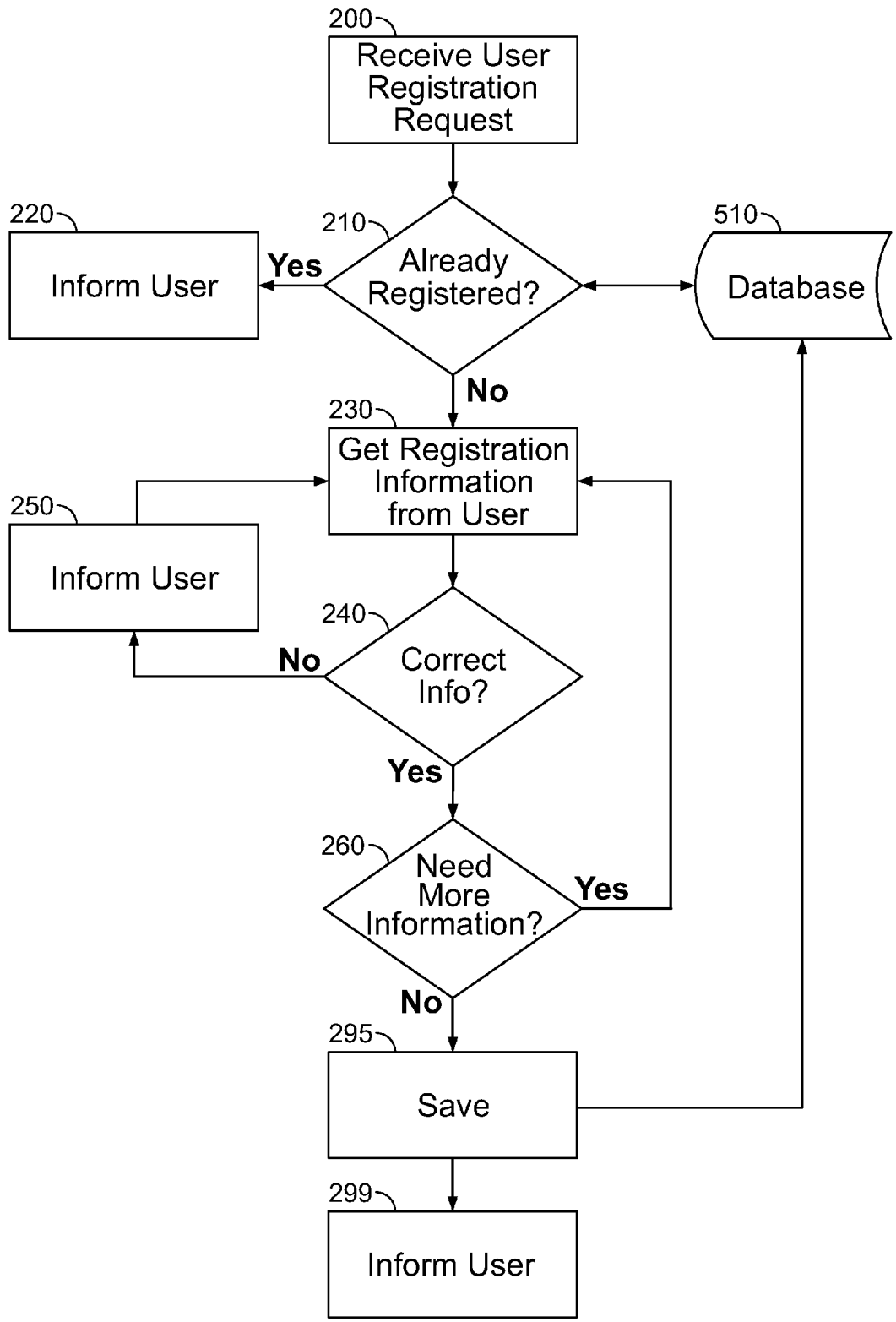
FIG. 4 is a flow chart illustrating another exemplary embodiment of the present invention.

A flow chart of another exemplary embodiment of the invention is depicted in FIG. 4. In this example the registration process may be handled entirely by the telephone server. In step 200, the registration server, which may or may not be the same as the telephone server, receives the registration request from the user. In a typical implementation of this embodiment, the user will call up the standard service number, and, if he is not registered, he will be transferred to this registration process. However, the registration process may also be achieved over the Internet, using DTMF over a phone line, WAP, or even with an operator-assisted service, or through any other suitable method.

The system will check if the user is already in the database of registered users for this service 510. If the user is already registered 210, the user is given a message to this effect 220. If not, the system proceeds to step 230. Here, the system will prompt the user for the necessary information, such as the user ID for the service (e.g. account number), possibly a social security number or similar, if needed, etc.

If the registration process occurs through some other means than through the telephone line, the user must also specify his telephone caller ID (telephone number), and there may be a need to verify that the user has given the correct telephone number. This may be achieved by sending a message to the telephone number given by the user, and have the user respond to this message, or supply a code including a log-on key transferred as part of a message in the registration process, thus proving that the user is in possession of the phone with this ID.

Once a certain piece of information is supplied by the user in step 230, the system may need to check that the information is correct, or has the correct format, e.g., the correct number of digits, etc. in step 240. If one piece of information was incorrect, the user is given a message about the problem and asked to submit the information again 250. If the information given is correct, the system may prompt for more information 260 until all is given.

Once all the information is received, the necessary information is saved 295 in a database 510, and the user is informed that the process is complete 299.

Example 5

Figure 5:
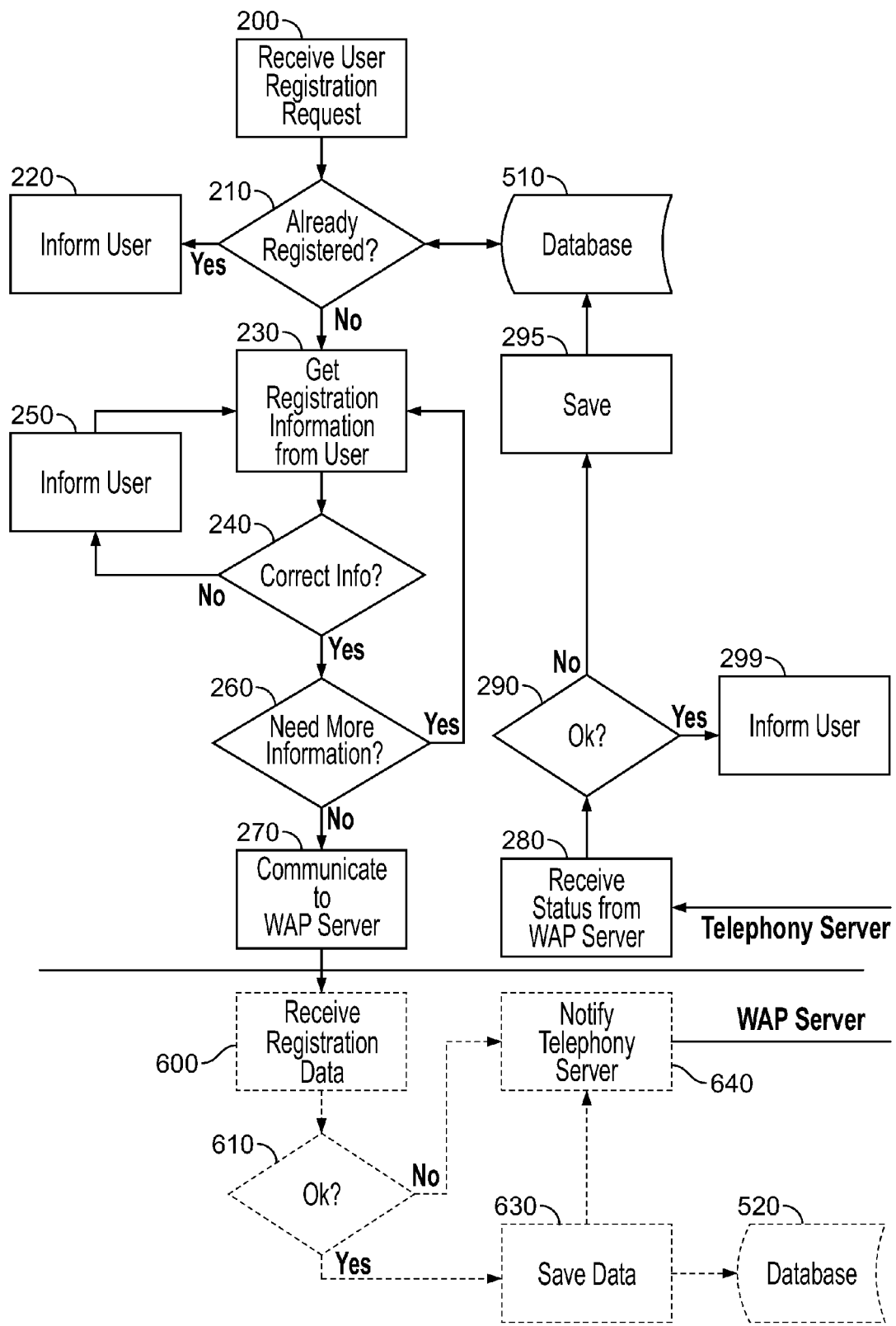
FIG. 5 is a flow chart illustrating a further exemplary embodiment of the present invention.

A flow chart of another exemplary embodiment of the invention is depicted in FIG. 5. In this exemplary embodiment the registration system must communicate with the actual service provider system. Steps 200 to 260 are the same as in the previous example, but in step 270, the registration system will send a confirmation request to the WAP server or the service provider system.

This request may contain the user ID in the service provider system as given by the user in the previous set 230, or it may be a request to receive this user ID, or an alias for the user ID based on information provided by the user or the system. The registration data are received 600 on the WAP Server side. The alias may be established expressly for the purpose of communication between the registration server and the service provider system, thus increasing security.

In step 610 the system checks that all is OK, and if not, in step 640, notifies the registration server (telephony server) that it was not. Alternatively, if the information is OK, the system may need to save some information for later use 630 in a database 520, and returns an OK, possibly with more information as required, to the registration server in step 640. In step 280 the registration server received this notification, i.e. the status from the WAP Server, and the system completes according the response in a similar way as in example 4 above.

In an exemplary embodiment of the invention, a registration may be to a specific service with a specific service provider and be valid for one service number only, such as a donation to a specific charity only. In other embodiments, the registration may be more general, so that e.g. a registration to a donation service for a specific charity with donations paid via a credit card, may automatically, or semi-automatically, register the user for other payment services or for donations to other charities. In this way, a cumbersome registration process may be simplified or entirely eliminated.

Figure 6C:
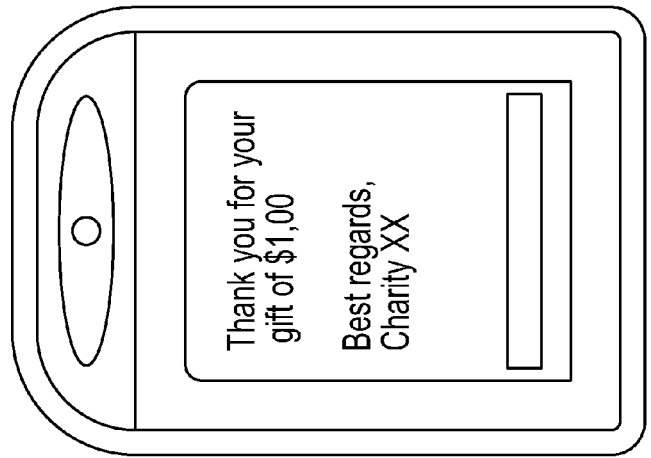
FIG. 6 is a set of exemplary screen shots according to an exemplary embodiment of the present invention.
Figure 6B:
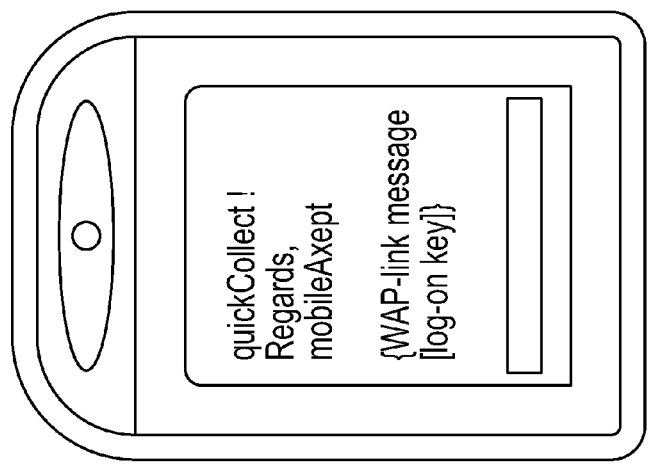
Figure 6A:
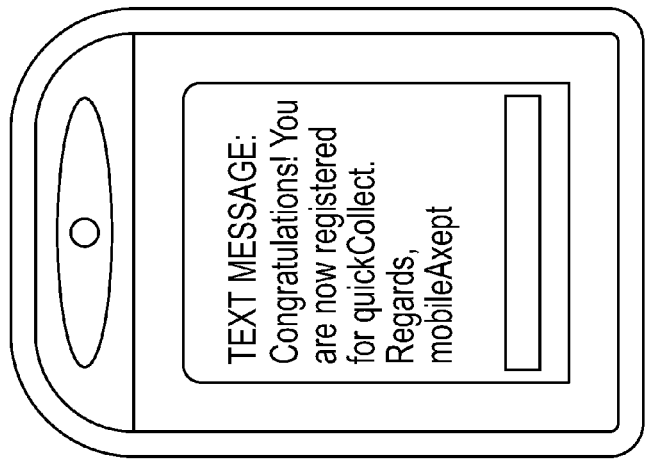

Various exemplary screen shots which are generated during execution of the program, according to the present invention, will now be described with reference to FIG. 6, which refer to an exemplary embodiment of a donation system according to the invention. FIG. 6a depicts exemplary screen of a message to the user confirming successful registration. FIG. 6b depicts an exemplary screen of a WAP link message transmitted to and presented to the user on the display of the mobile phone, the WAP link message containing the login key. As an example, the message can be:
{quickcollect,
regards mobileAxept
<http://194.24.252.72;8080/sms/mobile/regstep2.jsp?
accessNumber=004700030043&
mobileNumber=0047637576240&
accessCode=7293>
}

In this example a heading provides a user of a mobile phone with information about the service sending the message, while the remaining characters constitute a WAP-link which the user may click on, in order to activate a service, in this case a donation to a charity of some form having a receiving account linked to a telephone donation number. As can be seen, the log-on key in this case includes an access code.

In some implementations, or on some cell phones or terminals, the link would not be explicitly visible to a user, but a clickable link could be indicated on the display. FIG. 6c depicts an exemplary screen of a message to the user confirming successful donation, including confirmation of the amount donated.

Figure 7A:
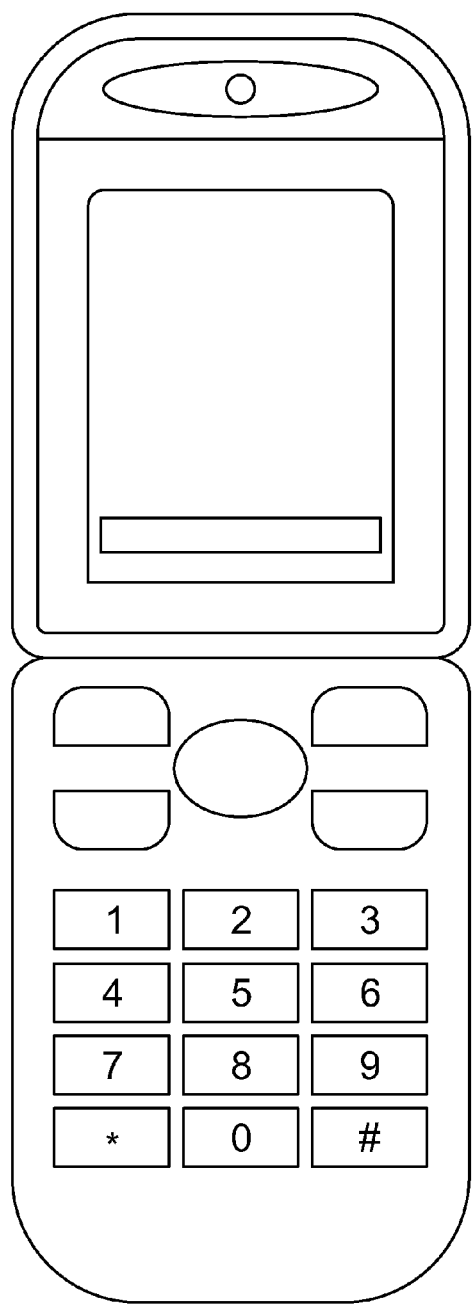
FIG. 7 shows a typical mobile phone (FIG. 7a) with keyboard (FIG. 7b) with only a numeric keyboard to which embodiments of the present invention are applicable.
Figure 7B:
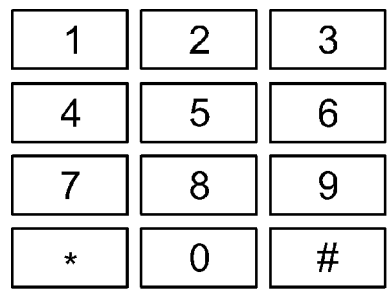

FIG. 7 illustrates a typical mobile telephone to which embodiments of the present invention are applicable. FIG. 7a shows a typical mobile telephone unit, including display and keyboard; and FIG. 7b illustrates a typical numeric keyboard of such a unit. Alphabetic characters are accessed through multiple clicks on a numeric key. E.g. To type a "c", the user must first put the phone in "alpha mode" and then click three times on the key of the number "2".

Figure 8:
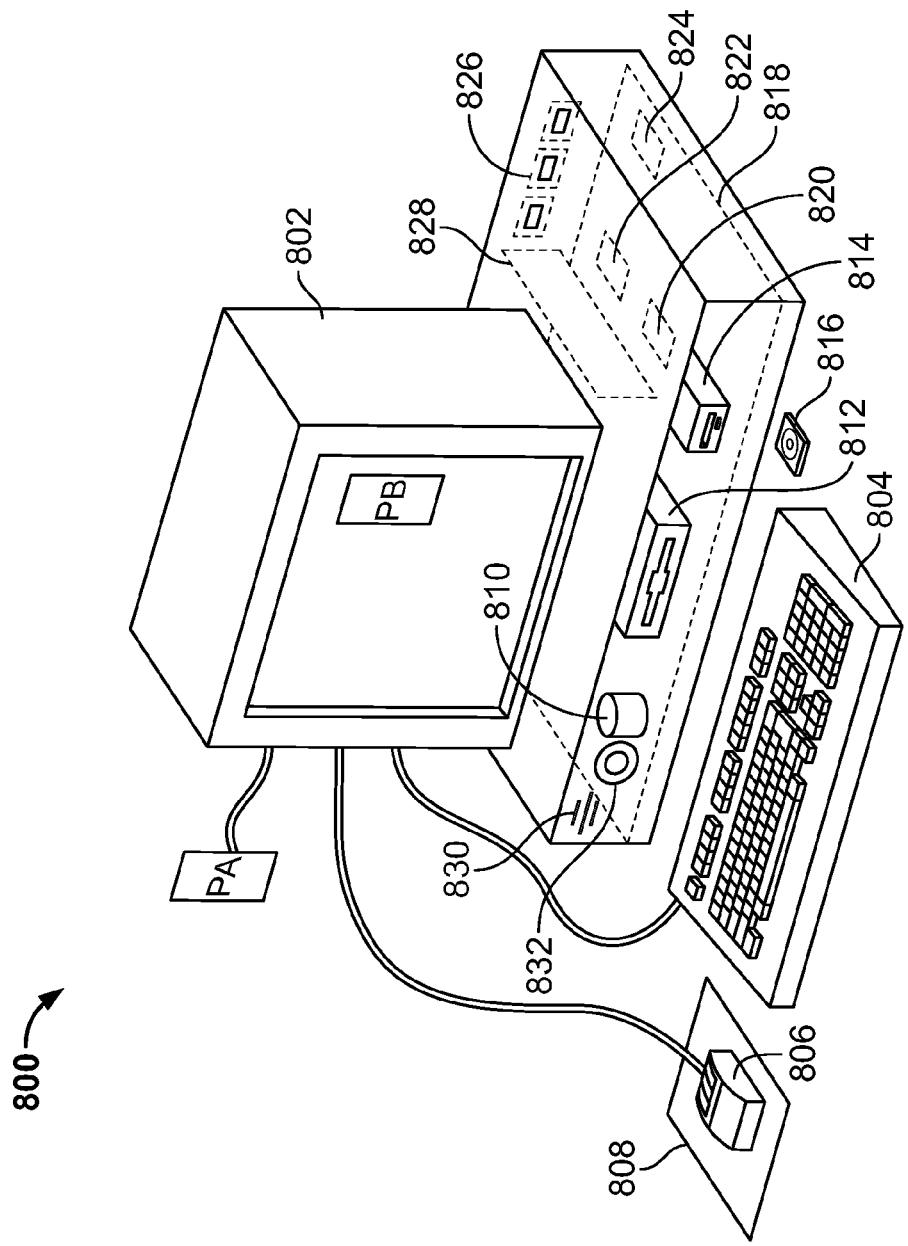
FIG. 8 is a schematic illustration of a general purpose computer for performing the processes of the present invention, according to an exemplary embodiment of the present invention.

FIG. 8 is a schematic illustration of a computer system for implementing the present invention. A computer 800, for example in the form of a portable or handheld type of personal computer (PC) can be used to implement the method according to the present invention, wherein the computer includes, for example, a display device 802, such as a conventional display device or a touch screen monitor with a touch-screen interface, etc., a keyboard 804, a pointing device 806, a mouse pad or digitizing pad 808, a hard disk 810, or other fixed, high density media drives, connected using an appropriate device bus (e.g., a SCSI bus, an Enhanced IDE bus, an Ultra DMA bus, a PCI bus, etc.), a floppy drive 812, a tape or CD ROM drive 814 with tape or CD media 816, or other removable media devices, such as magneto-optical media, etc., and a mother board 818. The mother board 818 includes, for example, a processor 820, a RAM 822, and a ROM 824 (e.g., DRAM, ROM, EPROM, EEPROM, SRAM, SDRAM, and Flash RAM, etc.), I/O ports 826 which may be used to couple to external devices, networks, etc., (not shown), and optional special purpose logic devices (e.g., ASICs) or configurable logic devices (e.g., GAL and re-programmable FPGA) 828 for performing specialized hardware/software functions, such as sound processing, image processing, signal processing, neural network processing, object character recognition (OCR) processing, etc., a microphone 830, and a speaker or speakers 832.

Using the standard technology mentioned above a computer program can be incorporated into the computer for realizing a telephone function. In the case of a portable laptop or handheld computer having a wireless connection, for example using a WLAN (Wide-Area Local Area Network), such a telephone function would include a user interface, in this case denoted PB on FIG. 8, presented on the display device for achieving telephone functionality. In an alternative, an external telephone device, denoted PA on FIG. 8, could be connected to the computer for achieving telephone function more similar to a traditional telephone. Such an external telephone device could for example be connected to a portable computer via a standard USB-interface in the computer.

As stated above, the system includes at least one computer readable medium, or alternatively, the computer readable medium may be accessed through various paths, such as networks, internet, drives, etc. Examples of computer readable media are compact discs, hard disks, floppy disks, tape, magneto-optical disks, PROMs (EPROM, EEPROM, Flash EPROM), DRAM, SRAM, SDRAM, etc. Stored on any one or on a combination of computer readable media, the present invention includes software for controlling both the hardware of the computer 800 and for enabling the computer 800 to interact with a human user via one of the said telephone devices PA, PB. Such software may include, but is not limited to, device drivers, operating systems and user applications, such as development tools. Such computer readable media further includes the computer program product of the present invention for performing any of the processes according to the present invention, described above (see, e.g., FIGS. 1-8). The computer code devices of the present invention can be any interpreted or executable code mechanism, including but not limited to scripts, interpreters, dynamic link libraries, Java classes, and complete executable programs, etc.

The invention may also be implemented by the preparation of application specific integrated circuits or by interconnecting an appropriate network of conventional component circuits, as will be readily apparent to those skilled in the art.

User identification and/or verification, according to embodiments of this invention, is a significant simplification relative to existing methods, and requires little or no training on the part of a user. In addition, a system according to embodiments of the present invention, can be created and created in most existing programming languages and be connected to most modern data enabled telephones. Therefore, according to embodiments of the present invention, the process of login on to a secure web site is significantly simplified, since this may now be performed using the simplified log-on process and a reduced number of keystrokes.

Although embodiments of the present invention is defined in terms of the user typing using the terminal or phone keyboard, the invention may also be implemented using voice identification or other substitutes for keyboard interaction, thus eliminating entirely or partly the need to use the terminal keyboard, as will be readily apparent to those skilled in the art.

Although embodiments of the present invention have been described in terms of the user's being able to activate a link to access a secure web site, the invention may also be implemented or used in a manner such that the user must type in the link and/or the logon key in order to access the web site.

Although embodiments of the present invention have been described in terms the caller identification information being the caller ID or telephone number, the system may also be implemented using other unique information associated with the call request.

Although embodiments of the present invention have been described in terms of sending the logon message to the user using the Caller ID as the address, the system may also use other means for identifying the user, and look up the correct address for the logon message based on such other identification.

Although the exemplary embodiments described in this text and figures imply a specific order of events, several of the events and processes may happen in a different order.

Although the present invention is described in terms of telephone servers, WAP servers, registration servers and/or service provider servers, these systems may in fact be combined in many different ways, e.g. into fewer systems and servers, or, on the contrary, be further divided into more servers performing only parts of the functionality described for each server in the embodiments described herein.

Obviously, numerous modifications and variations of embodiments of the present invention are possible in light of the above teachings. It is therefore to be understood that within the scope of the appended claims, the invention may be practiced otherwise than as specifically described herein.

The invention claimed is:

1. A method of authenticating a user for conduct of a transaction initiated by the user via a data-enabled telephone in such a manner as to make efficient use of keystrokes on the data-enabled telephone, such data-enabled telephone capable of initiating telephone calls over a telephone network and of engaging in two-way data communication with a data server in a network, such server enabling conduct of the transaction, the method comprising:
receiving caller identification information associated with a telephone call request initiated by the user via the data-enabled telephone to a service number, such caller identification providing a basis for authentication of the user; and
using the caller identification information received at the service number to address a message to the user;
including in such message a logon key for use by the user in accomplishing the transaction; and
sending such message;
so that on receipt of the message, the user may use the logon key to enter into data communication with the server for conduct of the transaction,
wherein the logon key serves to identify the user, and the method further comprises obtaining an additional verification of the user as a condition to conduct the transaction.

2. A method according to claim 1, wherein the logon key has a lifetime, for purposes of accomplishing the transaction, of less than a specified amount of time.

3. A method according to claim 2 wherein the message is in a format adapted to the capabilities of the user's telephone.

4. A method according to claim 1, wherein the logon key for use by the user can be used a limited number of times for purposes of accomplishing the transaction.

5. A method according to claim 1, wherein the caller identifying information includes a telephone number of the mobile telephone.

6. A method according to claim 1, wherein receiving and using the caller identification information is accomplished without answering the call request, so that a connection does not result from the call request.

7. A method according to claim 1, wherein receiving and using the caller identification information includes answering the call request, so that a connection is established.

8. A method according to claim 1, wherein sending the message includes sending the message to the user's mobile telephone and, on receipt of the message, the user may use the logon key to cause the mobile telephone to enter into data communication with the server.

9. A system for authenticating a user for conduct of a transaction initiated by the user via a data-enabled telephone in such a manner as to make efficient use of keystrokes on the data-enabled telephone, such data-enabled telephone capable of initiating telephone calls over a telephone network and of engaging in two-way data communication with a data server in a network, such server enabling conduct of the transaction, the system comprising:
a telephone server, associated with a service telephone number, for receiving caller identification information associated with a telephone call request initiated by the user via the data-enabled telephone to the service telephone number, such caller identification providing a basis for authentication of the user; such telephone server using the caller identification information received at the service number to address a message to the user, wherein such message includes a logon key for use by the user in accomplishing the transaction, and to send such message;
a data server for data communication with the data-enabled telephone of the user, accessible to the user upon use of the logon key by the user;
so that on receipt of the message, the user may use the logon key to enter into data communication with the data server for conduct of the transaction,
wherein the logon key serves to identify the user, and the telephone server obtains an additional verification of the user as a condition to conduct the transaction.

10. A system according to claim 9, wherein the logon key has a lifetime, for purposes of accomplishing the transaction, of less than a specified amount of time.

11. A system according to claim 9, wherein the logon key for use by the user can be used a limited number of times for purposes of accomplishing the transaction.

12. A system according to claim 9, wherein the caller identifying information includes a telephone number of the mobile telephone.

13. A system according to claim 9, wherein the telephone server obtains the caller identification information without answering the call request, so that a connection does not result from the call request.

14. A system according to claim 9, wherein the telephone server obtains the caller identification information in the course of answering the call request, so that a connection is established following the call request.

15. A system according to claim 9, wherein the capabilities of the user's telephone is information which is made available in the system, in order that the message format can be adapted to said capabilities.

16. A method comprising:
receiving caller identification information associated with a telephone call request initiated by a user to a service number associated with a server, wherein the telephone call is via a data-enabled telephone, and wherein the caller identification information provides a basis for authentication of the user;

generating a message to the server and sending the message from the server directly to the data-enabled telephone, wherein the caller identification information received at the service number is used to address the message to the user, and wherein the message includes a logon key for use by the user in accomplishing a transaction; and allowing the user to use the logon key, upon receipt of the message, to enter into data communication with the server to conduct the transaction, wherein the logon key serves to identify the user, and the method further comprises obtaining an additional verification of the user as a condition to conduct the transaction.

17. The method of claim 16, further comprising checking whether the user is registered at the server based on the caller identification information prior to sending the message.

* * * * *